Dec. 26, 1967

M. ETTER 3,360,709

ARRANGEMENTS FOR CONTROLLING GENERATORS
SHOWING AN ADJUSTABLE CONDUCTIVITY

Filed Aug. 9, 1963

Inventor:
MARCEL ETTER
By: McGlew and Toren
Attorneys

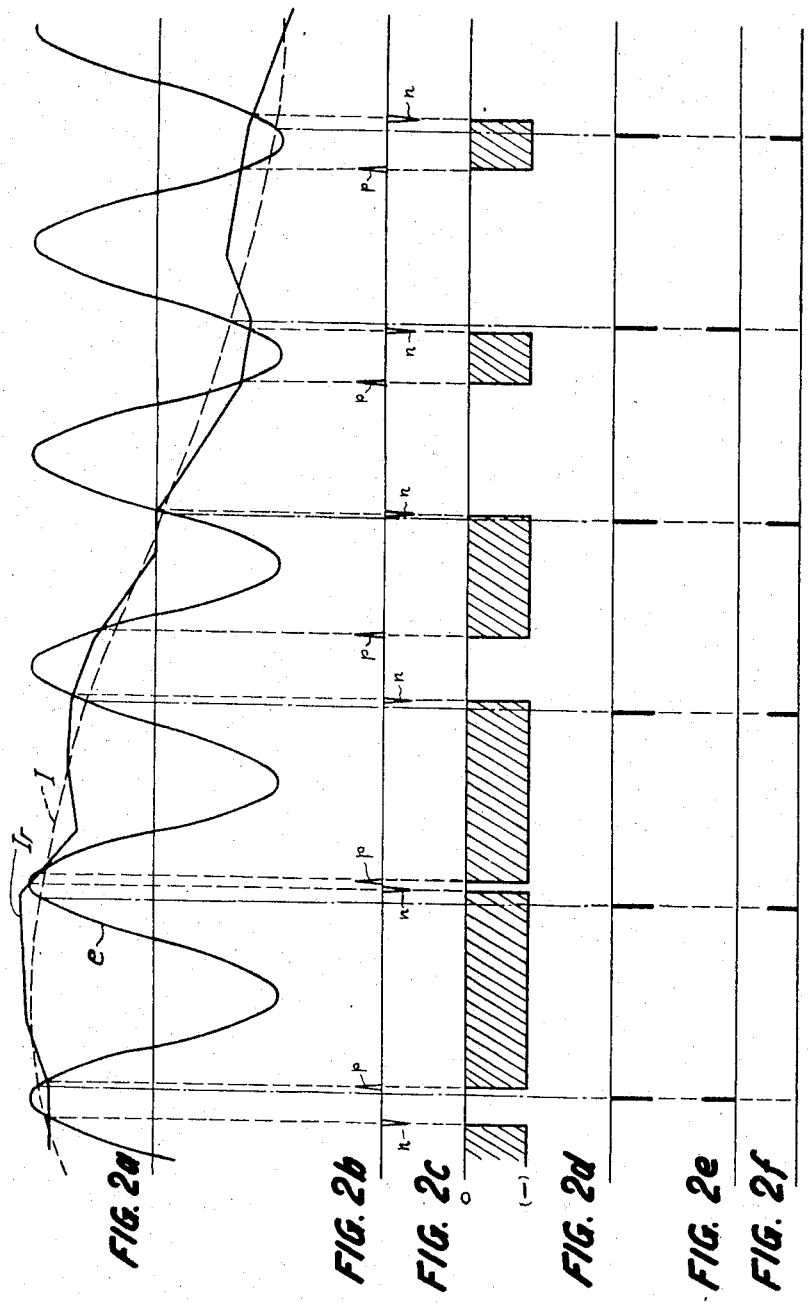

United States Patent Office 3,360,709
Patented Dec. 26, 1967

3,360,709
ARRANGEMENTS FOR CONTROLLING GENERATORS SHOWING AN ADJUSTABLE CONDUCTIVITY
Marcel Etter, 6 Blvd. des Promenades,
Carouge-Geneva, Switzerland
Filed Aug. 9, 1963, Ser. No. 301,062
Claims priority, application Switzerland, Aug. 13, 1962,
9,577/62
6 Claims. (Cl. 321—5)

My invention has for its object undulator or inverter networks including elements having an adjustable conductivity and it covers more particularly control systems for such networks, which latter serve generally for the production, starting from a supply of D.C., of an A.C. output voltage of a rectangular shape. The possibility of producing a mean output voltage of a sinusoidal or the like shape by supplying pulses of a variable duration of a high frequency is well-known in the art. However, the problem of controlling such pulses is a difficult matter.

My invention has for its object a comparatively simple and inexpensive arrangement adapted to control a generator having an adjustable conductivity. According to my invention, the control arrangement includes an auxiliary oscillator supplying a reference signal the shape of which corresponds to that of the signal which is to be produced by the generator. Means are provided to compare periodically the signal supplied by the generator with the instantaneous value of the reference signal, with the frequency of comparison differing from the frequency of the reference signal. These comparing means are adapted to adjust the conductivity of the generator so that its signal is proportional to the instantaneous value of the reference signal, the frequency of the signal produced by the generator being equal to the difference between frequency of the reference signal and a frequency selected from the fundamental and harmonic frequencies of the succession of instantaneous values.

The central arrangement of the invention is of particular interest for the production of a polyphase current or voltage in which a perfect phase relation and an equal amplitude for each phase may be ensured without any further care. It is also of considerable interest in the case where the output amplitude and frequency are to be modified within a large range. This is in particular the case when the generator has to produce a rotary field for driving a motor in both directions of rotation at a variable speed and at speeds extending in a range including a zero value.

I have illustrated by way of example in the accompanying drawings a preferred embodiment of my improved control arrangement. In said drawings:

FIGS. 2a–2f is a diagram illustrating the particular operation of the generator according to FIG. 1.

Figure 1:
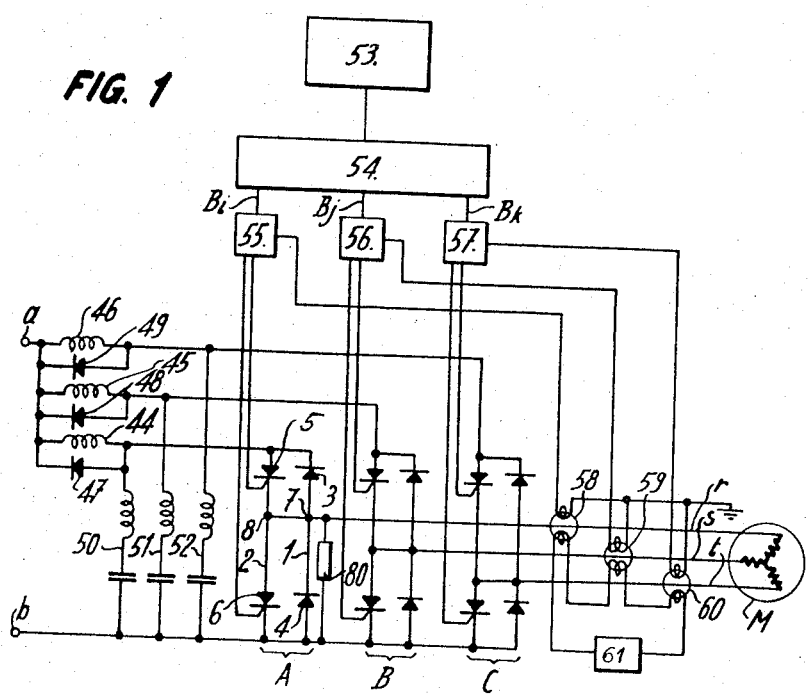
FIG. 1 is a general wiring diagram of a generator of three-phase current of a variable amplitude and of an adjustable frequency.

The generator illustrated in FIG. 1 is adapted to supply a three-phase A.C. feeding the motor M. This generator includes three circuit breaking units A, B, C, each constituted by two sections 1 and 2 connected in parallel. The section 1 includes two unidirectional conductive elements formed by the diodes 3 and 4 connected in series, while the section 2 includes two unidirectional conductive elements 5 and 6, the conductivity of which is controlled, and which are inserted in series and have their polarities opposed to that of the diodes 3 and 4 of the other section 1. The respective medial points 7 and 8 of the two elements 1 and 2 of each unit are interconnected and form an output tapping for a respective one of the A.C. phases. Each of the three units A, B, C thus, is provided with a corresponding output terminal r, s, t for the three-phase current.

The elements 5 and 6, the conductivity of which is controlled are constituted each by a solid thyratron or so-called control diode, such as a silicon controlled rectifier (SCR). These semi-conductive elements whose operation is comparable with that of gas-filled thyratrons, may be brought to a conductive condition by applying a pulse of a short duration to a control electrode and they remain conductive as long as the current passing through them is not reversed or has not dropped to zero. In order to cut off suddenly their conductive condition, it is therefore necessary to produce a reversal of the current passing through them during a comparatively short time, of a magnitude of say 20 microseconds.

Each of the units A, B, C is fed by a common supply of D.C. connected across the terminals a and b, through the agency of a respective induction coil 44, 45, 46 shunted by a corresponding diode 47, 48 or 49. Each unit A, B, C is connected in parallel with an oscillating circuit 50, 51, 52, each including an induction coil and a condenser in series.

To produce a three-phase A.C. adapted to feed the motor M, the solid thyratrons 5 and 6 of each block are controlled by an electronic system to be described hereinafter. Considering first the unit A alone, it is apparent that the medial point of the latter is brought to the positive voltage of the terminal a when the solid thyratron 5 or the diode 3 is conductive, whereas it is brought to the negative potential of the terminal b when the solid thyratron 6 or the diode 4 is conductive. The mean voltage of the medial point may also be brought to any intermediate value by causing the thyratron 5 to be alternatingly conductive and non-conductive for a positive phase current and the thyratron 6 for a negative phase current, and by suitably adjusting the ratio between the durations of the periods of conductivtiy and of non-conductivity. The continuity of the passage of current during the period of extinction is ensured for an inductive load by the diode 3 or 4. For instance, the current of the phase r passing through the thyratron 5 remains alive after extinction of thyratron 5 by passing through the diode 4 so as to return to the supply in the opposite direction. Thus, a succession of ignition periods and extinction periods for the thyratrons 5 and 6 allows giving to the medial point of the associated circuit-breaking unit, any desired voltage selected between the limits defined by the voltage across the terminals a and b.

In the case of the diagram illustrated in FIG. 1, the extinction of a solid thyratron 5 or 6 which is ignited in a circuit-breaking unit may be performed by feeding a control pulse adapted to ignite the other thyratron in the same unit. This results in that the condenser of the oscillating circuit 50 for the unit A, which was loaded under the potential of the D.C. supply, is discharged by an oscillating current feeding the corresponding induction coil, and this discharge current passes through the thyratrons 5 and 6. During the first part of this discharge, the discharge current passing through the induction coil of the oscillating circuit reverses the potential of the associated condenser. The latter produces then a further discharge pulse through the thyratrons 5 and 6 in a direction opposed to their direction of normal conductivity, which leads to their extinction, while the discharge current passes then through the diodes 3 and 4.

A dangerous increase in the current supplied by the source at the moment of the short circuit produced by the simultaneous conductivity of the two thyratrons 5 and 6 of a same unit is cut out or at least delayed by the induction coils 44, 45 or 46 connecting the respective unit with the terminal $a$ of the source of current.

The excess voltage which might interrupt or reverse the current flow in one of the windings 44, 45 or 46 at the moment of the extinction of the associated solid thyratrons in the corresponding breaking unit is quenched by the respective diode 47, 48 or 49 shunting said winding. The respective diode prevents thus the speedy decay of the current in the windings 44, 45 or 46, the value of the actual resistance of these windings being, however, selected with a sufficiently high value for said windings to absorb speedily their magnetic energy and to cut out any dangerous increase in intensity in the case of a speedy succession of extinctions.

It is also possible to resort to other circuit connections which allow cutting out or recovering such an inductive energy.

The control system of the circuit includes a pulse generator 53 supplying auxiliary pulses at an adjustable frequency of a magnitude of 3 kilocycles. The pulses fed by generator 53 are applied to a distributor 54 including a ring counter provided with three outputs $Bi$, $Bj$, $Bk$ each of which is with a respective control system 55, 56 or 57.

The pulses fed by the oscillator or generator 53 are subdivided into groups of three and the control system 55 receives the first pulse of each group while the systems 56 and 57 receive respectively the second and third pulse of each group. The frequency of the pulses feeding each control system is therefore a magnitude of 1 kilocycle. Each control system 55, 56 or 57 is adapted to control the ignition of the solid thyratrons 5 and 6 of the corresponding unit A, B or C.

Each control system cooperates with measuring means adapted to check periodically whether the current supplied by the main generator A, B, C is more positive or more negative than the value it should actually show. To this end, each control system 55, 56, 57 is fed by a signal produced by a corresponding element 58, 59 or 60 measuring the current supplied by the associated generator. Each of the elements 58, 59, 60 is inserted in the corresponding phase feeding the motor M, and includes a magnetic core having a rectangular characteristic curve and carrying three windings; one of these windings includes a single convolution and is fed by the phase current, whereas another is fed by a sinusoidal A.C. supplied by a further oscillator or generator 61 at a frequency of 1 kilocycle. The ampere-turns of the current supplied by the generator 61 are reversed with reference to those of the phase current so that the magnetic field becomes equal to zero when the ampere-turns are equal. By reason of the rectangular shape of the characteristic curve of the magnetic core, the latter passes from a saturated condition with one polarity to the saturated condition of the opposite polarity as soon as the ampere-turns produced by the current from the generator 61 assume a value higher or lower than that of the ampere-turns produced by the phase current fed into the motor M. Each time the saturated condition of the magnetic core is reversed, a voltage is induced in the third winding on the latter and this voltage is applied to the control system 55, 56 or 57 connected with the respective measuring element. The third winding of each measuring element supplies thus a negative pulse whenever the ampere-turns fed by the generator 61 are more positive than the ampere turns of the respective phase, and it supplies similarly a positive pulse whenever the ampere-turns fed by the generator 61 become more negative than those of respective phase.

FIGS. 2a to 2f illustrate the pulses obtained during operation of the arrangement for the phase $r$. The curve $e$ of FIG. 2a illustrates the ampere-turns produced by the sinusoidal reference signal fed by the generator 61. The curve I shows the variations of the ideal phase current which it is desired to obtain and the curve Ir shows the actual current obtained.

FIG. 2b shows the output pulses of the measuring element 58.

FIG. 2c illustrates the electric signal supplied by a memory or strong means associated with the control system 55 as described hereinafter, this signal varying between two values each time the measuring element 58 produces a pulse.

FIG. 2d illustrates the pulses supplied by the terminal $Bi$ of the distributor 54 to the control system 55.

FIGS. 2e and 2f illustrate the ignition pulses applied to the thyratrons 5 and 6 respectively.

The control system 55 is sensitive to the voltage illustrated in FIG. 2c and its reaction is such that it produces the ignition of one thyratron or of the other according to the condition of the memory, as given by the signal illustrated by FIG. 2c at the moment at which a pulse is received from the distributor 54, this pulse being illustrated in FIG. 2d.

If the curve of FIG. 2c is at its value 0 at the moment of the arrival of a pulse from distributor 54, as shown in FIG. 2d, the control system ignites the thyratron 5, whereby the current in the phase $r$ becomes more positive. When the signal shown in FIG. 2c is at its value (−) at the moment of the arrival of a pulse according to FIG. 2d, the control system ignites the thyratron 6 which makes the phase current more negative.

The curve corresponding to the ideal current I is defined by a succession of points illustrating the instantaneous value of the reference signal $e$ at the moment of each pulse produced by the distributor 54 as shown in FIG. 2d.

In brief, the thyratrons 5 and 6 are ignited according as to whether the actual current Ir is more negative or more positive than the ideal current I at the moment at which the control system 55 receives a pulse from the distributor 54. Consequently, the phase current matches the ideal curve with a slight shifting above and below the latter.

The modifications in the slope of the curve Ir which have been illustrated between the successive moments at which the thyratrons are ignited, are produced by modifications in the other phase currents $s$ and $t$.

The generator 53 operates under variable frequency conditions and its frequency may be adjusted to a value substantially different from the 3 kilocycle value referred to hereinabove. The frequency of this generator may for instance be adjusted within a range extending between 2,700 cycles and 3,200 cycles.

Assuming the generator 53 supplies a frequency of 3,300 cycles, each control system 55, 56 or 57 is fed at a frequency of 1,100 cycles.

Figure 3:
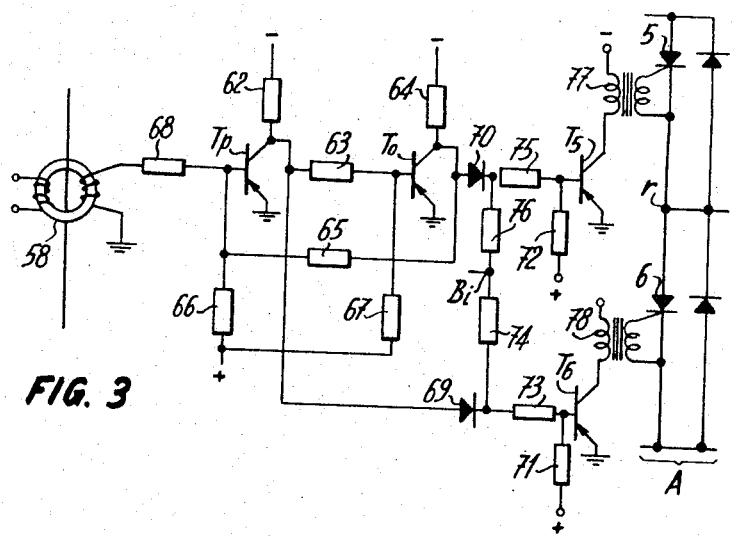
FIG. 3 illustrates a detail circuit for incorporation with the diagram of FIG. 1.

The terminals $Bi$, $Bj$ and $Bk$ of the distributor 54 supply, as a matter of fact, and each in its turn, a pulse from the generator 53. These pulses of a magnitude of about 1 kilocycle are applied to the control systems 55, 56 and 57 in alternation. FIG. 3 shows the detail of one of the control arrangements which includes two transistors $Tp$ and $To$ constituting a conventional memory or storing means. The collector of the transistor $Tp$ is connected with a negative feed terminal through a resistance 62 and with the base of the transistor $To$ through a resistance 63. The collector of the transistor $To$ is also connected with the negative feed terminal through a resistance 64 and back to the base of the resistance $Tp$ through a resistance 65. A positive bias is applied to the bases of said transistors through the agency of the resistances 66 and 67. The signal supplied by one of the measuring elements, say the element 58 in the case illustrated, is applied to the base of the transistor Tp through a resistance 68.

When the element 58 feeds a negative pulse, it makes the transistor Tp conductive and the collector of the latter is then practically at ground potential. The base of the transistor To is then positive by reason of the presence of the voltage divider constituted by the resistances 63 and 67.

The transistor To is therefore blocked and the negative potential of its collector is applied through the agency of the resistance 65 to the base of the transistor Tp which remains thus conductive even after the end of the control pulse. On the other hand, whenever the element 58 supplies a positive pulse, it blocks the transistor Tp and the negative potential of the collector of the latter transmits, through the resistance 63, a negative voltage to the base of the transistor To which becomes conductive.

The collector of each of the transistors Tp and To is connected through a diode 69 or 70, according to the case, with the base of the corresponding further transistor T6 or T5. The base of each of the two last-mentioned transistors is biased positively through a resistance 71 or 72, according to the case, and the two bases are also connected, respectively through resistances 73 and 74 and through resistances 75 and 76, with the output terminal Bi of the distributor 54. The two transistors T5 and T6 are adapted to supply ignition pulses to the thyratrons 5 and 6 of the unit A through the agency of the corresponding transformers 77 and 78.

When a negative output pulse is fed by the distributor 54 to the point Bi joining the resistances 74 and 76, the operation is different, according as to whether the transistor Tp or Tc is conductive. As a matter of fact, if To is conductive, its collector is practically grounded and the negative voltage at the terminal Bi is absorbed by the resistance 76 by reason of the conductivity of the diode 70 for said negative pulse. The transistor T5 remains therefore blocked by reason of the positive potential applied to its base. In contradistinction, the same pulse at Bi makes the base of the transistor T6 negative through the agency of the resistances 74 and 73 since the diode 69 is connected with the highly negative collector of the blocked transistor Tp. FIG. 2c illustrates the voltage of the collector of the transistor Tp. The transistor T6 is thus brought into its conductive stage during the pulse so that it supplies consequently the ignition voltage to the solid thyratron 6.

If, on the other hand, at the moment of the application of a negative pulse at Bi between the resistances 74 and 76, the transistor Tp is conductive while the transistor To is blocked, this negative pulse does not reach the transistor T6 but, in contradistinction, it reaches the transistor T5, whereby the solid thyratron 5 is ignited.

It is thus apparent that if, at the moment of the application of a negative pulse to the terminal Bi, the measuring element 58 has fed a positive pulse to the transistor Tp, the pulse received at Bi produces the ignition of the solid thyratron T6. If, in contradistinction, at the moment of the arrival of the negative pulse at the terminal Bi, the last pulse supplied by the measuring element 58 was negative, the pulse at Bi produces the ignition of the solid thyratron 5. One obtains thus in a comparatively simple manner an automatic control by the current supplied by the phase r. Of course, the arrangement illustrated in FIG. 3 is repeated twice again in the generator of FIG. 1 so as to form the control systems 56 and 57 respectively.

Turning again to FIGS. 2 and 3, it is apparent that if the current of one phase is more negative than the desired current, the negative pulse will be produced ahead of the ideal moment, the positive pulse later than the ideal moment. Consequently, the transistor Tp being then conductive under the action of the negative pulse, the pulse from the distributor 54, which is received at the moment at which the generator 61 supplies ampere turns correspond to the ideal value of the current for the phase considered, produces the ignition of the thyratron 5. If, in contradistinction the current is more positive than the ideal current, the negative pulse is provided with a lag and the positive pulse with a lead with reference to the ideal moment and consequently, at the arrival of the pulse from the distributor 54, the control system produces the ignition of the thyratron 6 and it is irrelevant from this standpoint that the current from the generator 61 is then increasing or decreasing. It is thus found that if, for a positive alternation of the phase current, its intensity is too low, the thyratron 5 is ignited which connects the respective phase with the positive terminal a. If, in contradistinction, the current is too high during the positive alternation, the thyratron 6 is ignited.

However, if the thyratron 5 is still ignited as a consequence of the control performed by a preceding pulse, the next control results in a simultaneous ignition of both thyratrons 5 and 6. This leads to a closing of the oscillating circuit of the corresponding phase, which circuit is constituted by members in series, say the circuit 50 for the phase r, and consequently the condenser of the respective circuit feeds an oscillating discharge current which produces an extinction of both associated thyratrons 5 and 6.

Similarly, if the current is more negative than the ideal current during a negative alternation, the arrangement is such that the thyratron 5 is ignited, which, in the case of the other thyratron being still ignited, would simultaneously extinguish both thyratrons 5 and 6. If, on the other hand, the phase current is more positive than the ideal current during a negative alternation or half cycle, only the thyratron 6 is ignited, whereby the negative terminal b is connected with the medial point of the respective unit so that the current may become more negative. It should be remarked that, when an ignition pulse is applied to a thyratron while the diode in parallel therewith is conductive, the pulse does not effect the ignition of the thyratron, the voltage across the terminals thereof being slightly negative.

As a modification, a single extinguishing circuit may be used by way of a simplification, the different units A, B, C being then inserted in parallel on their feed side and being associated for instance with a single oscillating circuit including elements inserted in series if such a circuit is resorted to for extinguishing purposes. In such a case, the ignition of the second thyratron in a unit of which the first thyratron is already ignited produces the extinction of all the ignited thyratrons in all the units. It should be remarked that a supplementary memory should then be incorporated with each phase, so as to retain the direction of passage of the last ignition pulse and to reignite the thyratrons after each extinction. With such a modification, it becomes possible to ignite or extinguish the thyratrons otherwise than at the moments of the pulses from the distributor 54. This allows reducing the frequency of extinction and ignition with reference to the frequencies of the oscillators 53 and 61 so as to group as much as possible the extinctions of the thyratrons in the different stages and thereby it allows also reducing the total number of extinctions required.

Such supplementary memories, which retain the direction of the control pulses, are also essential for the undulators resorting to elements having an adjustable conductivity and of the transistor type, for instance, with a view to maintaining under control the base currents, starting from the incoming of the control pulses up to their disappearance.

By reason of the presence of the control means provided for the units A, B, C, the generator supplies an AC whose frequency is equal to the difference between the frequencies of the pulses at the output terminals of the distributor 54 and that of the generator 61. It is thus an easy matter to adjust the frequency of the three phase current obtained by adjusting the frequency of the pulse generator 53. It is also possible not to modify the adjustment of generator 53 and to adjust instead the frequency of the generator 61. According to the sign of the difference in frequencies, it is possible to make a synchronous or asynchronous motor rotate in either direction.

It is also possible to obtain proportionality between the intensity of the current fed by the generator 61 and that of the current feeding the motor M. If it is desired to obtain a current whose curve is somewhat different from a sinusoid, it is sufficient to resort to a generator 61 producing a current of the desired shape, assuming, of course, that the load can absorb such a current.

Furthermore, it is possible to select for the oscillator 61 a frequency approximating that of one harmonic of the frequency of the pulses fed by the distributor 54. In this event, the frequency of the signal delivered by the generator is equal to the difference between the frequency of comparison and the frequency of the said harmonic.

In the case illustrated in FIG. 1, the measuring elements 58, 59 and 60 may be designed so as to be sensitive to the mean voltage in each phase instead of to its intensity.

In the case of a voltage generator, for instance, it is possible no longer to compare the ampere turns in an annulus adapted to be saturated, but to compare directly the output voltage after filtering with a reference A.C. voltage, the issue of the comparison acting on the first transistor memory including the transistor $T_p$, $T_o$ of FIG. 3 so as to make them change condition each time the reference A.C. voltage becomes more positive or more negative than the filtered voltage in one phase of the generator.

What I claim is:

1. In combination with a main generator of an adjustable conductivity and effective to produce a signal of an adjustable amplitude and adjustable first frequency, a reference generator producing a reference signal at a predetermined second frequency much higher than said first frequency, the curve representing the variation with respect to time of the reference signal having the same shape as the corresponding curve representing the variation with respect to time of the signal to be produced by said main generator, means comparing, at a comparison frequency different from the frequency of the reference signal, the successive instantaneous values of the reference signal with the corresponding instantaneous values of the main generator signal, means controlled by said comparing means and controlling the conductivity of the main generator, to maintain the main generator signal substantially proportional to said successive instantaneous values of the reference signal, the frequency of the main generator signals being equal to the difference between the frequency of the reference signal and a frequency selected from the fundamental and harmonic frequencies of the comparison frequency.

2. In combination with a main generator of an adjustable conductivity and effective to produce a signal of an adjustable amplitude and adjustable first frequency, a reference generator producing a reference signal at a predetermined second frequency much higher than said first frequency, the curve representing the variation with respect to time of the reference signal having the same shape as the corresponding curve representing the variation with respect to time of the signal to be produced by said main generator, means comparing, at a comparison frequency different from the frequency of the reference signal, the successive instantaneous values of the reference signal with the corresponding instantaneous values of the main generator signal to derive the sign of the differences between said values, means controlled by the sign of the differences fed thereto by said comparing means controlling the conductivity of the main generator in accordance with the sign of said differences to maintain the main generator signal substantially proportional to said successive instantaneous values of the reference signal.

3. In combination with a main generator of an adjustable conductivity and effective to produce a signal of an adjustable amplitude and adjustable first frequency, a reference generator producing a reference signal at a predetermined second frequency much higher than said first frequency, the curve representing the variation with respect to time of the reference signal having the same shape as the corresponding curve representing the variation with respect to time of the signal to be produced by said main generator, comparing means, including a magnetic core, a first winding carried by said core and fed with the main generator signal and a second winding fed with the reference signal, the magnetic action of both windings being opposed one to the other, means controlled by the magnetic action resulting from the difference between the generator and reference signals and controlling the conductivity of the main generator in accordance with such differences to maintain the main generator signal substantially proportional to said successive instantaneous values of the reference signal.

4. In combination with a main polyphase generator of an adjustable conductivity and effective to produce a signal of an adjustable amplitude and adjustable first frequency, at least one reference generator producing a reference signal for each phase at a predetermined second frequency much higher than said first frequency, the curve representing the variation with respect to time of the reference signals having the same shape as the corresponding curve representing the variation with respect to time of the signal to be produced by said phase of the main generator, comparing means including, for each phase of the generator, a magnetic core, a first winding carried by said core and fed with the corresponding phase of the main generator signal and a second winding fed with the reference signal, the magnetic action of both windings being opposed one to the other, means controlled by the magnetic action resulting from the difference between the generator and reference signals and controlling, at a frequency different from that of the reference signal, the conductivity of the main generator in accordance with said magnetic field, to maintain the main generator signal in the corresponding phase substantially proportional to said successive instantaneous values of the reference signal.

5. In combination with a main generator of an adjustable conductivity and effective to produce a signal of an adjustable amplitude and adjustable first frequency, a reference generator producing a reference signal at a predetermined second frequency much higher than said first frequency, the curve representing the variation with respect to time of the reference signals having the same shape as the corresponding curve representing the variation with respect to time of the signal to be produced by the main generator, comparing means including a magnetic core, a first winding carried by said core and fed with the main generator signal and a second winding fed with the reference signal, the magnetic action of both windings being opposed one to the other, means subjected to the magnetic action resulting from the difference between generator aand reference signals and producing a signal controlling the conductivity of the main generator in accordance with the instantaneous polarity of the magnetization of the core to maintain the main generator signal substantially proportional to said successive instantaneous values of the reference signal.

6. In combination with a main polyphase generator of an adjustable conductivity and effective to produce signals of adjustable amplitude and adjustable first frequency, a common reference generator adapted to produce one reference signal at a predetermined second frequency much higher than said first frequency, the curve representing the variation with respect to time of the reference signal having the same shape as the corresponding curve representing the variation with respect to time of the signal to be produced by the main generator, means comparing, at a comparison frequency different from the frequency of the reference signal, the successive instantaneous values of the reference signal with the corresponding instantaneous values of the main generator signals in each phase, means controlled by said comparing means and controlling the conductivity of the main generator to maintain the main generator signals in the corresponding phase substantially proportional to said successive instantaneous values of the reference signal, the frequency of the main generator signals being equal to the difference between the frequency of the reference signal in one phase and that of a frequency selected from the fundamental and harmonic frequencies of the comparison frequency.

References Cited

UNITED STATES PATENTS

| | | | |
|---|---|---|---|
| 3,214,672 | 10/1965 | Watkins | 321—16 |
| 3,310,730 | 3/1967 | Ruch | 321—45 |

JOHN F. COUCH, *Primary Examiner.*

W. SHOOP, *Assistant Examiner.*